United States Patent
Kalvoda

(10) Patent No.: US 10,309,811 B2
(45) Date of Patent: Jun. 4, 2019

(54) FLUID FLOW MEASURING DEVICE AND ARMATURE COMPRISING A FLUID FLOW MEASURING DEVICE

(71) Applicant: Honeywell Technologies Sarl, Rolle (CH)

(72) Inventor: Pavel Kalvoda, Ujezd u Brna (CZ)

(73) Assignee: Honeywell Technologies Sarl, Rolle (CH)

( * ) Notice: Subject to any disclaimer, the term of this patent is extended or adjusted under 35 U.S.C. 154(b) by 168 days.

(21) Appl. No.: 15/183,672

(22) Filed: Jun. 15, 2016

(65) Prior Publication Data

US 2016/0377463 A1 Dec. 29, 2016

(30) Foreign Application Priority Data

Jun. 25, 2015 (EP) .................................. 15173754

(51) Int. Cl.
*G01F 1/115* (2006.01)
*G01F 1/58* (2006.01)
*G01F 1/075* (2006.01)

(52) U.S. Cl.
CPC ............ *G01F 1/58* (2013.01); *G01F 1/075* (2013.01); *G01F 1/115* (2013.01)

(58) Field of Classification Search
CPC . G01F 1/075; G01F 1/115; G01F 1/58; G01F 1/586; G01F 1/588
See application file for complete search history.

(56) References Cited

U.S. PATENT DOCUMENTS 3,002,384 A * 10/1961 MacDonald ............ G01F 1/115
  324/173
3,996,800 A * 12/1976 Rosso ..................... G01F 1/115
  73/861.78

(Continued)

FOREIGN PATENT DOCUMENTS

CN         104568032 A      4/2015
CN         204758063 U     11/2015
(Continued)

OTHER PUBLICATIONS

European Search Report for EP Application Serial No. 15173754.1 dated Jan. 11, 2016.

(Continued)

*Primary Examiner* — Natalie Huls
(74) *Attorney, Agent, or Firm* — Shumaker & Sieffert, P.A.

(57) ABSTRACT

Fluid flow measuring device for measuring a fluid flow, comprising a rotatable, magnetic element, wherein the rotatable, magnetic element is positioned in the fluid flow, wherein the rotation of the rotatable, magnetic element depends from the fluid flow, wherein the rotation of the rotatable, magnetic element generates a magnetic field; further comprising at least one sensing coil pair having a first sensing coil and a second sensing coil, wherein the respective sensing coils of each sensing coil pair are arranged in such a way that the magnetic field generated by the fluid flow dependent rotation of the rotatable element has a first polarity and a first phase in the region of the respective first sensing coil and a second polarity and a second phase in the region of the respective second sensing coil, wherein at least said polarities differ from each other.

16 Claims, 4 Drawing Sheets

(56) References Cited

U.S. PATENT DOCUMENTS

| | | | | |
|---|---|---|---|---|
| 4,109,526 A | * | 8/1978 | Rosso | G01F 1/115 |
| | | | | 73/272 A |
| 4,462,263 A | | 7/1984 | Bash | |
| 4,489,615 A | * | 12/1984 | Ward | G01F 3/10 |
| | | | | 377/21 |
| 5,187,989 A | * | 2/1993 | Bulteau | G01F 15/068 |
| | | | | 324/166 |
| 6,604,434 B1 | * | 8/2003 | Hamilton | G01F 1/075 |
| | | | | 324/207.21 |
| 8,757,011 B2 | * | 6/2014 | Isicovich | G01F 1/075 |
| | | | | 73/861.88 |

FOREIGN PATENT DOCUMENTS

| | | |
|---|---|---|
| JP | 55135711 A | 10/1980 |
| JP | 63015119 A | 1/1988 |
| JP | 06041867 B | 6/1994 |
| JP | 2001021394 A | 1/2001 |

OTHER PUBLICATIONS

Dlugos, "Wiegand Effect Sensors Theory and Applications," Sensors, vol. 15, No. 5, pp. 32-34, May 1998.

* cited by examiner

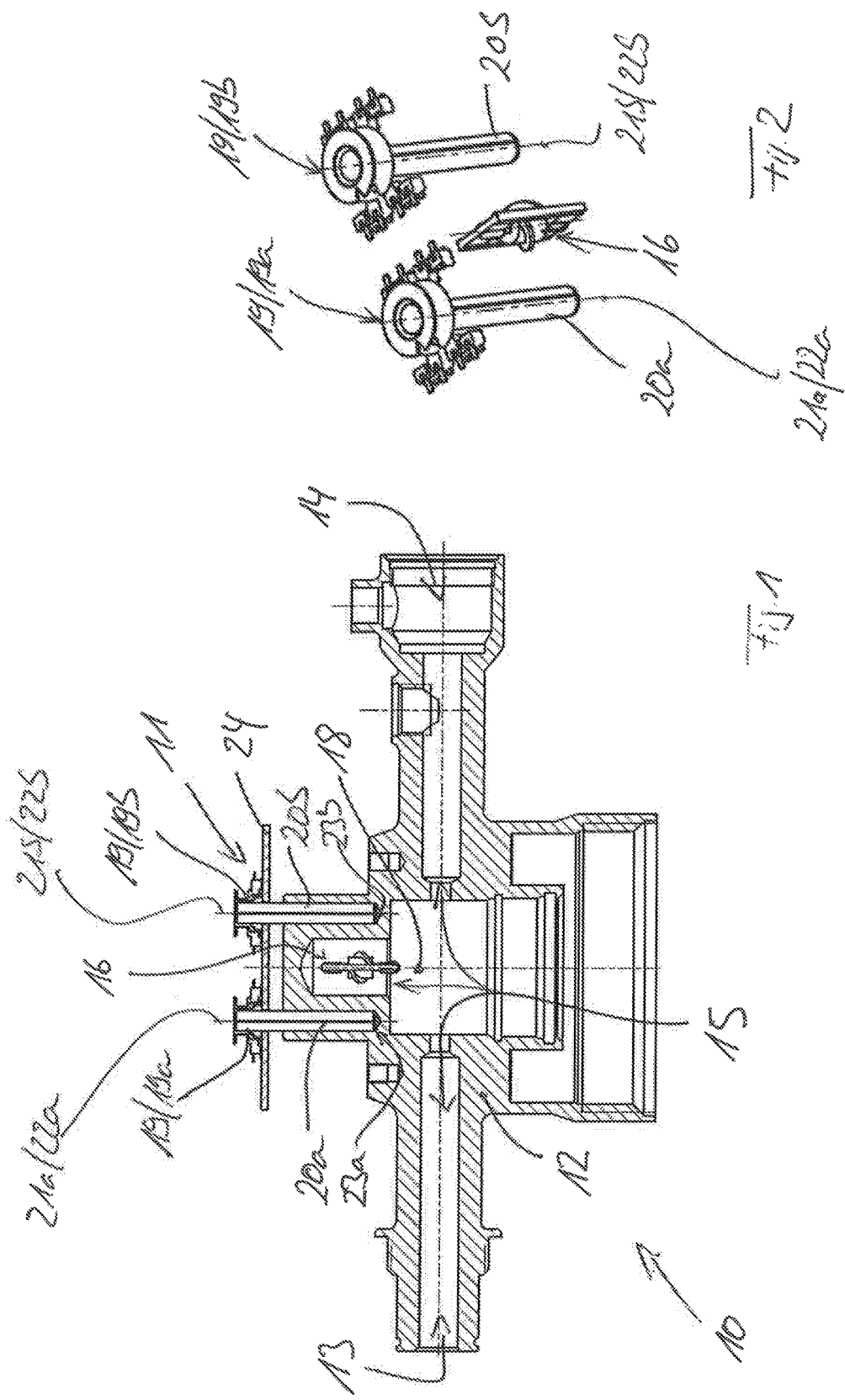

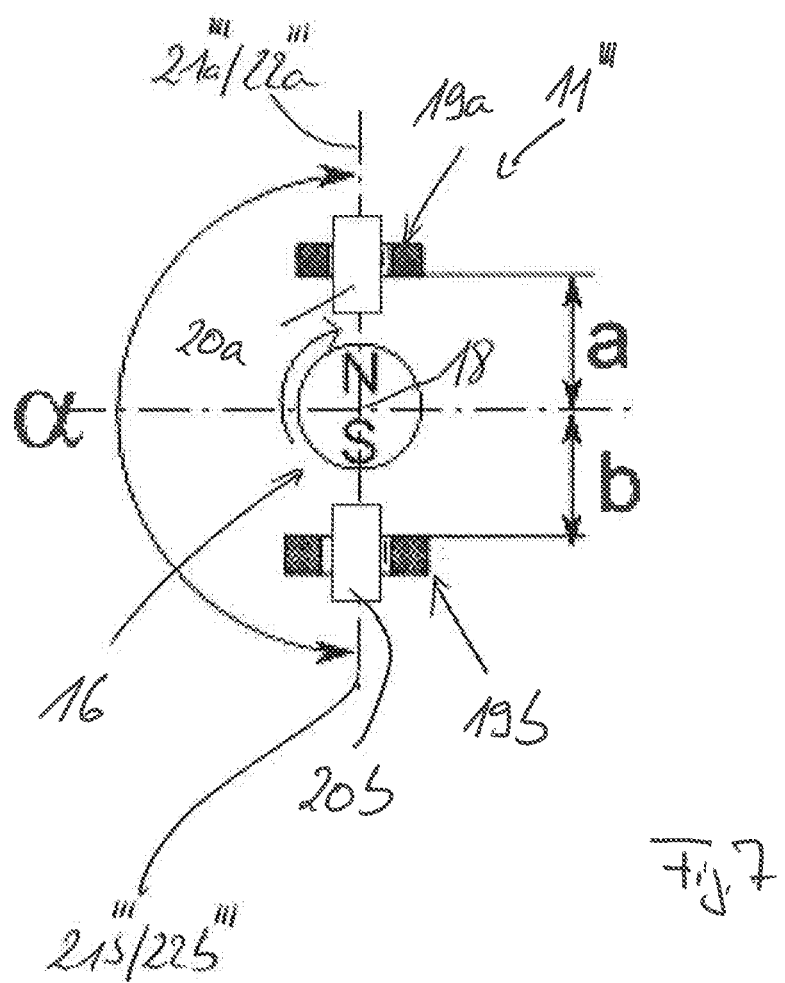

FLUID FLOW MEASURING DEVICE AND ARMATURE COMPRISING A FLUID FLOW MEASURING DEVICE

This application claims priority to European Patent Application Serial No. 15 173 754.1, filed Jun. 25, 2015, which is incorporated herein by reference.

The present patent application relates to a fluid flow measuring device and to an armature for a fluid system comprising such a fluid flow measuring device.

In fluid systems like potable water systems it is desired to measure the fluid flow through the fluid system or through components of fluid system like through armatures. For the time being such a fluid flow measurement is provided by separate devices. Such devices use for the fluid flow measurement a rotatable element positioned in the fluid flow, whereby the number of rotations per time unit or the rotation speed of the rotatable element is used to measure the fluid flow.

It is known that such fluid flow measuring devices make use of a magnetic rotatable element, wherein the rotation of the rotatable, magnetic element generates a magnetic field which is detected by a sensing coil. The magnetic field induces an electrical current signal in the sensing coil, namely an alternate current signal, which frequency is determined. The frequency of the electrical current signal depends from the fluid flow. If the magnetic strength of the rotatable, magnetic element is too weak and/or if the sensing distance between the rotatable, magnetic element and the sensing coil is too big, than the signal induced in the sensing coil can be disturbed by noise caused by the magnetic field generated by electrical devices like the motors, transformers and the like. The frequency of the noise signal induced by such magnetic disturbance is in the range of the frequency induced by the rotatable, magnetic element. This results in an inaccurate fluid flow measurement. This is also the reason why fluid flow measuring is provided by separate devices and not as integral function of armatures.

It is desired to provide a fluid flow measuring device which can provide a more reliable fluid flow measuring being less effected by noise caused by the magnetic field generated from electrical devices and which can be an integral element of armatures.

Against this background, a novel fluid flow measuring device according to claim 1 is provided.

The novel fluid flow measuring device comprises a rotatable, magnetic element, namely a magnetic turbine wheel or a paddle wheel having at least one pair of magnetic paddles, wherein the rotatable, magnetic element is positioned in the fluid flow, wherein the rotation of the rotatable, magnetic element depends from the fluid flow, and wherein the rotation of the rotatable, magnetic element generates a magnetic field.

The novel fluid flow measuring device further comprises at least one sensing coil pair having a first sensing coil and a second sensing coil, wherein the respective sensing coils of each sensing coil pair are arranged in such a way that the magnetic field generated by the fluid flow dependent rotation of the rotatable element has a first polarity and a first phase in the region of the respective first sensing coil and a second polarity and a second phase in the region of the respective second sensing coil, wherein at least said phases and preferably also said polarities differ from each other.

The novel fluid flow measuring device can provide a more reliable fluid flow measuring being less effected by noise caused by the magnetic field generated from disturbing electrical devices.

Further, the novel fluid flow measuring device can be an integral element of armatures.

According to a preferred embodiment of the invention, the respective first sensing coil of each sensing coil pair is positioned around, namely wound around, a first ferromagnetic core that is positioned at a first circumferential position of the rotatable, magnetic element, and the respective second sensing coil of each sensing coil pair is positioned around, namely wound around, a second ferromagnetic core that is positioned at a second, different circumferential position of the rotatable, magnetic element. The first ferromagnetic core guides the magnetic field generated by rotation of the rotatable element to the respective first sensing coil, wherein the second ferromagnetic core guides the magnetic field generated by rotation of the rotatable element to the respective second sensing coil. A longitudinal axis of the respective first ferromagnetic core which corresponds to the winding axis of the respective first sensing coil around the respective first ferromagnetic core runs parallel to the rotation axis of the rotatable, magnetic element and has a first distance from the rotation axis of the rotatable element, wherein a longitudinal axis of the respective second ferromagnetic core which corresponds to the winding axis of the respective second sensing coil around the respective second ferromagnetic core runs also parallel to the rotation axis of the rotatable, magnetic element and has a second distance from the rotation axis of the rotatable element. Said first distance and said second distance are preferably identical or almost identical. This allows a beneficial integration of the fluid flow measurement device in an armature and at the same time a reliable fluid flow measuring being less effected by noise caused by a disturbing magnetic field.

The respective sensing coils of the respective sensing coil pair are preferably connected in series. Further, an angle between said first circumferential position and said second circumferential position at which the respective ferromagnetic cores are positioned is preferably 180° or almost 180°. Almost 180° covers an angular deviation of maximum 5° from 180°. This allows a very reliable fluid flow measuring being less effected by noise caused by the magnetic field generated from electrical devices.

Preferred developments of the invention are provided by the dependent claims and the description which follows. Exemplary embodiments are explained in more detail on the basis of the drawing, in which:

FIG. 1 shows a cross section of an armature for a fluid system comprising a fluid flow measuring device;

FIG. 2 shows a detail of the armature of FIG. 1;

FIG. 7 shows a schematic illustration of a further fluid flow measuring device.

Figure 3:
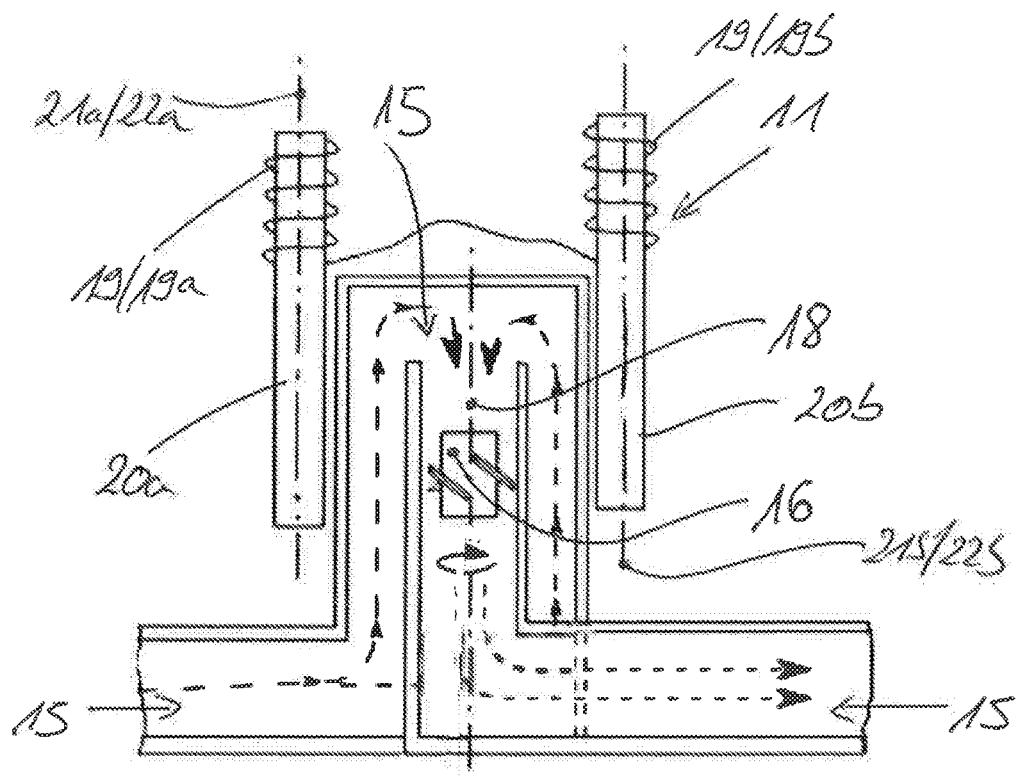
FIG. 3 shows a schematic illustration of the armature of FIG. 1.

The present application relates to a fluid flow measuring device and to an armature for a fluid systems like a potable water system comprising such a fluid flow measuring device.

FIGS. 1 to 4 illustrate details of an armature 10 for a fluid system having as an integral element a fluid flow measuring device 11.

The armature 10 can be a water treatment armature like a water filter or back flow preventer armature or pressure regulator armature or control valve armature or the like.

The armature 10 comprises a housing 12 that provides an inlet 13 for the fluid, an outlet 14 for the fluid and a flow channel 15 for the fluid, wherein said flow channel 15 extends between the inlet 13 and the outlet 14.

The fluid flow measuring device 11 which is preferably an integral element of the armature comprises a rotatable, magnetic element 16. The rotatable, magnetic element 16 is positioned in the fluid flow, namely in the flow channel 15.

The rotation of the rotatable, magnetic element 16 depends from the fluid flow through the flow channel 15. The rotation of the rotatable, magnetic element 16 generates an alternating magnetic field.

The rotatable, magnetic element 16 can be provided by magnetic turbine wheel or a paddle wheel having at least one pair of magnetic paddles.

In the embodiment of FIGS. 1 to 4, the rotatable, magnetic element 16 is provided by a magnetic turbine wheel providing on the first half a south pole S and on the opposite second half a north pole N (see FIG. 4), wherein a separation plane 17 between the south pole S and the north pole N runs parallel to a rotation axis 18 of the rotatable, magnetic element 16.

The fluid flow measuring device 11 which is preferably an integral element of the armature 10 further comprises at least one sensing coil pair 19 having a first sensing coil 19a and a second sensing coil 19b.

The respective sensing coils 19a, 19b of each respective sensing coil pair 19 are arranged in such a way that the magnetic field generated by the fluid flow dependent rotation of the rotatable element 16 has a first polarity and a first phase in the region of the respective first sensing coil 19a and a second polarity and a second phase in the region of the respective first sensing coil 19b, wherein at least said first and second phases and preferably in addition said first and second polarities differ from each other.

By using at least one such coil pair 19 with sensing coils 19a, 19b that make use of the magnetic field with different phases and preferably different polarities in the region of the sensing coils 19a, 19b of the respective coil pair 19, the influence of noise caused by a disturbing magnetic field generated from electrical devices can be eliminated, especially when the source of the disturbing magnetic field has a distance from the sensing coils 19a, 19b being at least 5 times the distance between the sensing coils 19a, 19b.

Further, such a fluid flow measuring device 11 can be integrated in a fluid armature like a water armature and can provide an accurate and reliable flow measurement.

The first sensing coil 19a of respective sensing coil pair 19 is positioned around, namely wound around, a first ferromagnetic core 20a. The second sensing coil 19b of respective sensing coil pair 19 is positioned around, namely wound around, a second ferromagnetic core 20b. A longitudinal axis 21a of the first ferromagnetic core 20a which corresponds to the winding axis 22a of the first sensing coil 19a around the first ferromagnetic core 20a runs parallel to the rotation axis 18 of the rotatable, magnetic element 16. A longitudinal axis 21b of the second ferromagnetic core 20b which corresponds to the winding axis 22b of the first sensing coil 19b around the first ferromagnetic core 20b runs also parallel to the rotation axis 18 of the rotatable, magnetic element 16 and therefore parallel to the longitudinal axis 21a of the first ferromagnetic core 20a.

Said first ferromagnetic core 20a guides the magnetic field generated by the rotation of the rotatable element 16 with the first polarity and the first phase to the first sensing coil 19a of respective sensing coil pair 19. Said second ferromagnetic core 20b guides the magnetic field generated by the rotation of the rotatable element 16 with the second polarity and the second phase to the second sensing coil 19b of respective sensing coil pair 19.

Figure 4:
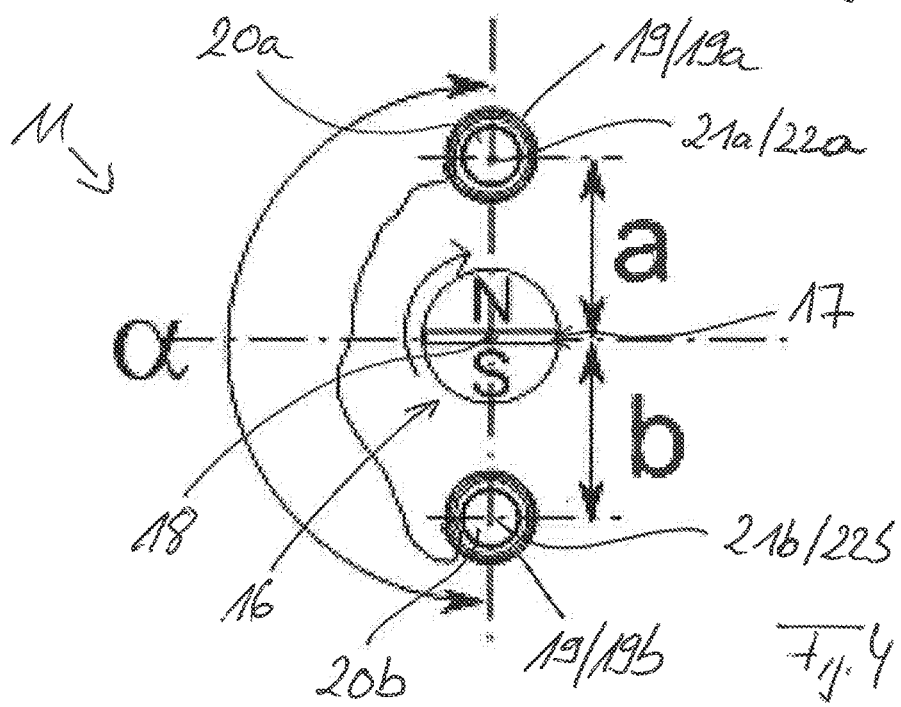
FIG. 4 shows a top view on elements of the fluid flow measuring device of the armature of FIG. 1.

The first ferromagnetic core 20a is positioned at a first circumferential position of the rotatable, magnetic element 16. The second ferromagnetic core 20b is positioned at a second, different circumferential position of the rotatable, magnetic element 16. In FIG. 4 an angle α between said circumferential positions is illustrated.

The angle α between said first circumferential position and said second circumferential position is in a range between 45° and 180°, preferably in a range 135° and 180°. Most preferably, the angle α is 180°. When the angle α is 180° the signal based on the magnetic field of the rotatable, magnetic element 16 is maximal and the noise signal caused by the magnetic field by disturbing electrical devices is minimal.

If the angle α is 180°, the first phase and the second phase differ from each other by a phase shift of 180° which results further in different, namely reversed, polarities.

If the angle α is not 180°, the first phase and the second phase differ from each other by a phase shift, but the performance is still acceptable, especially in the range of angle α down to 135°.

The longitudinal axis 21a of the respective first ferromagnetic core 20a has a first distance a from the rotation axis 18 of the rotatable element 16. The longitudinal axis 21b of the second ferromagnetic core 20b has a second distance b from the rotation axis 18 of the rotatable element 16. Said first distance a and said second distance b are preferably identical, meaning a=b, or almost identical, meaning $0.95 \leq a/b \leq 1.05$, to further ensure that signal based on the magnetic field of the rotatable, magnetic element 16 is maximal.

However, it should be noted that said first distance "a" and said second distance "b" can be significantly different from each other. The ratio a/b can be in the range $0.5 \leq a/b \leq 2.0$.

As mentioned above, the magnetic field provided by the fluid flow dependent rotation of element 16 has at least different phases and preferably also different polarities in the region of the sensing coils 19a, 19b of the respective coil pair 19. However, the magnetic field generated from electrical devices has the same phase and same polarity in the region of the sensing coils 19a, 19b of the respective coil pair 19. By subtracting the electrical current signals induced in the sensing coils 19a, 19b the influence of the magnetic field generated from the disturbing electrical devices can be eliminated, especially when the source of the disturbing magnetic field has a distance from the sensing coils 19a, 19b being at least 5 times the distance a+b between the sensing coils 19a, 19b.

Such a subtraction can be provided by an operational amplifier or by a simple series connection of the sensing coils 19a, 19b.

The rotatable, magnetic element 16 of the fluid flow measuring device 11 is positioned within the flow channel 15 of the armature housing 12 and thereby within the fluid flow.

The ferromagnetic cores 20a, 20b of the fluid flow measuring device 11 are positioned within recesses 23a, 23b of the armature housing 12 outside of the flow channel 15 and thereby outside the fluid flow. The sensing coils 19a, 19b of the fluid flow measuring device 11 are positioned on a printed circuit board 24 outside of the armature housing 12. The sensing coils 19a, 19b can also be wound directly on the ferromagnetic cores 20a, 20b. Further, the sensing coils 19a, 19b can be bobbin pushed on the ferromagnetic cores 20a, 20b.

The armature housing 12 is made from a non-ferromagnetic material like aluminum, brass, non-magnetic stainless steel, plastic and the like.

As mentioned above, the sensing coils 19a, 19b of the respective sensing coil pair are preferably connected in serious to provide the subtraction of their signals thereby eliminating the noise signal. Other electrical components for processing the electrical current signals of the sensing coils 19a, 19b may be provided on the printed circuit board 24.

The above details described for the embodiment of FIGS. 1 to 4 are preferred and allow in combination with each other a beneficial integration of the fluid flow measuring device 11 in an fluid armature 10, while the fluid flow measurement is less effected by noise caused by the magnetic field generated from electrical devices so that the fluid flow measurement is accurate and reliable.

Figure 5:
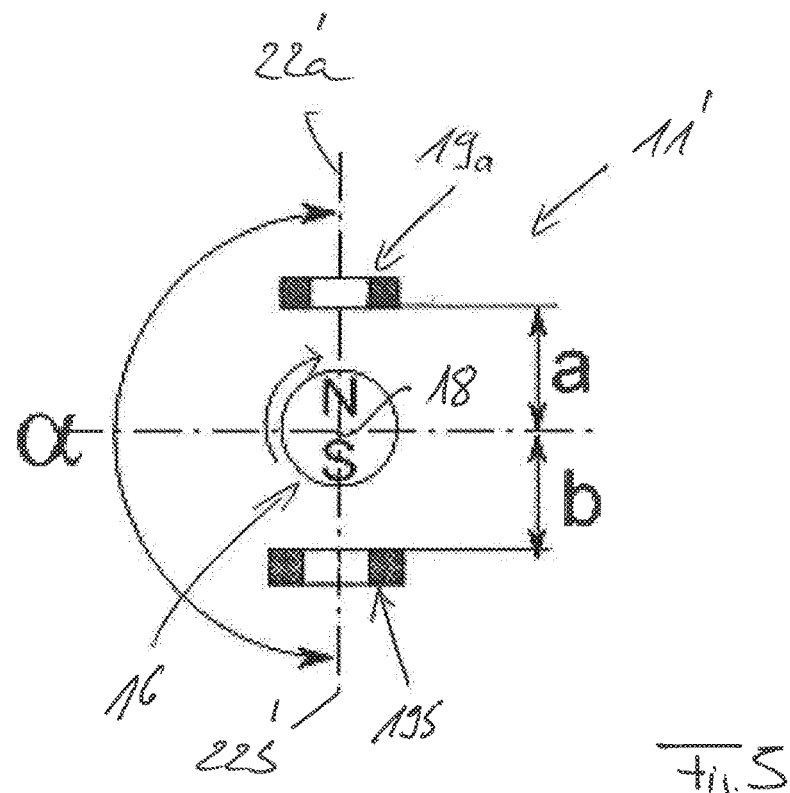
FIG. 5 shows a schematic illustration of a further fluid flow measuring device.
Figure 6:
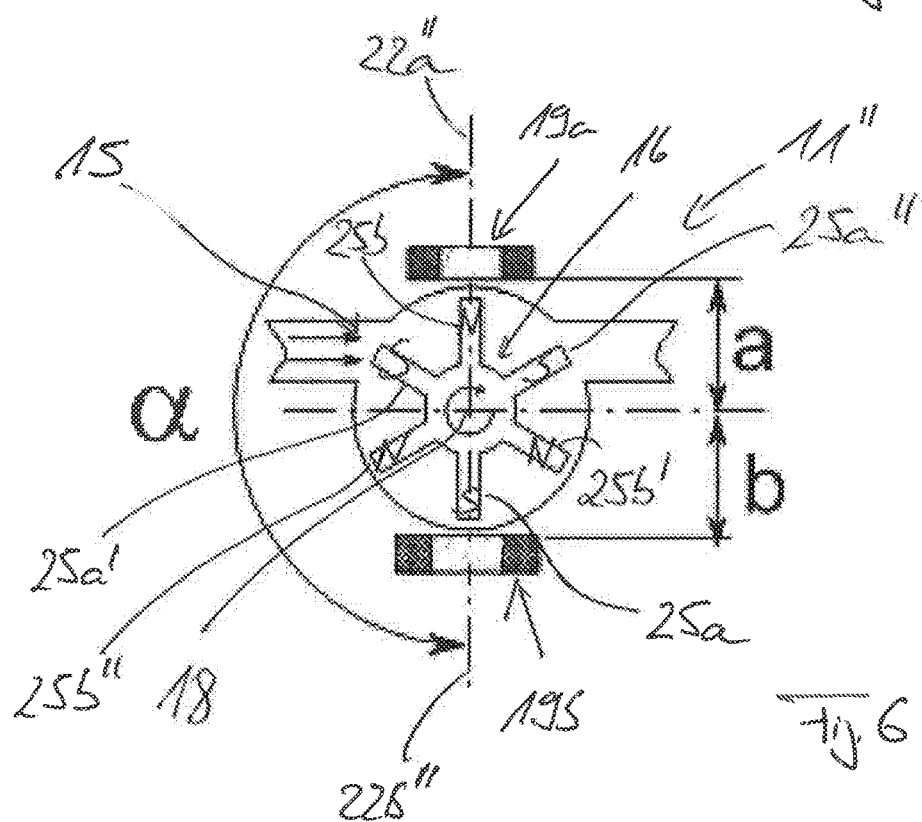
FIG. 6 shows a schematic illustration of a further fluid flow measuring device.

FIGS. 5, 6 and 7 illustrate other embodiments of a fluid flow measuring devices 11', 11", 11'". However, the embodiment of FIGS. 1 to 4 is preferred.

The fluid flow measuring devices 11', 11", 11'" of FIGS. 5, 6 and 7 also comprise a rotatable, magnetic element 16 and at least one sensing coil pair 19 having a first sensing coil 19a and a second sensing coil 19b. The sensing coils 19a, 19b of the respective sensing coil pair 19 are preferably connected in series.

The magnetic element 16 of the fluid flow measuring devices 11" of the embodiment of FIGS. 5, 7 corresponds to the magnetic element 16 of the embodiment of FIGS. 1 to 4, wherein the same is provided by a magnetic turbine wheel providing on the first half a south pole S and on the opposite second half a north pole N.

The magnetic element 16 fluid flow measuring devices 11" of the embodiment of FIG. 6 is provided by a paddle wheel having at least one, in the shown embodiment three, paddle pairs of paddles 25a, 25b, 25a', 25b', 25a", 25b", wherein the paddles 25a, 25a', 25a" provide south poles S and the paddles 25b, 25b', 25b" provide north poles N.

The respective sensing coils 19a, 19b of the respective sensing coil pair 19 are arranged in such a way that the magnetic field generated by the fluid flow dependent rotation of the rotatable element 16 has a first polarity and a first phase in the region of the respective first sensing coil 19a and a second polarity and a second phase in the region of the respective second sensing coil 19b, wherein at least said phases and preferably also said polarities differ from each other.

In the embodiments of FIGS. 5 and 6 the first sensing coil 19a and the respective sensing coil 19b of the respective coil pair 19 are both air coils, meaning that the embodiments of FIGS. 5 and 6 do not make use of the ferromagnetic cores.

In the embodiment of FIG. 7, which is similar to the embodiment of FIG. 5, the first sensing coil 19a and the respective sensing coil 19b of the respective coil pair 19 are wound around ferromagnetic cores 20a, 20b. It should be noted that also the embodiment of FIG. 6 can make use of the ferromagnetic cores 20a, 20b.

The winding axis 22a', 22 a", 22a'" of the first sensing coil 19a of the respective sensing coil pair 19 runs perpendicular to the rotation axis 18 of the rotatable, magnetic element 16. Further on, the winding axis 22b', 22b", 22b'" of the second sensing coil 19b of the respective sensing coil pair 19 runs perpendicular to the rotation axis 18 of the rotatable, magnetic element 16.

In FIG. 7, the longitudinal axis 21a'", 21b'" of the ferromagnetic cores 20a, 20b which correspond to the winding axis 22a'", 22b'" of the sensing coils 19a, 19b around the ferromagnetic cores 20a, 20b run perpendicular to the rotation axis 18 of the rotatable, magnetic element 16.

The respective first sensing coil 19a of the embodiments of FIGS. 5, 6 and 7 is positioned at a first circumferential position of the rotatable, magnetic element 16 and the respective second sensing coil 16b is positioned at a second, different circumferential position of the rotatable, magnetic element. The angle α between said first circumferential position and said second circumferential position is in a range between 45° and 180°, preferably in a range 135° and 180°.

In the all embodiments the angle α is preferably 180°. When the angle α is 180° the signal based on the magnetic field of the rotatable, magnetic element 16 is maximal and the noise signal caused by the magnetic field by disturbing electrical devices is minimal.

If the angle α is 180°, the first phase and the second phase of the magnetic field in the region of the coils 19a, 19b differ from each other by a phase shift of 180° which results further in different, namely reversed, polarity of the magnetic field in the region of the coils 19a, 19b.

However, it is also possible to use angles α different from 180°.

In the embodiment of FIGS. 1 to 4, the angle α is preferably in a range between 45° and 180°. In the embodiment of FIGS. 1 to 4, with an angle α of 90° the signal based on the magnetic field of the rotatable, magnetic element 16 is 50% of the maximum signal and the noise signal caused by the magnetic field by disturbing electrical devices is minimal.

In the embodiments of FIGS. 5, 6 and 7, the angle α is preferably in a range between 135° and 180°. In the embodiment of FIGS. 5, 6 and 7, with an angle α of 90° the signal based on the magnetic field of the rotatable, magnetic element 16 is 50% of the maximum signal, however the noise signal caused by the magnetic field by disturbing electrical devices is maximal. So, an angle of 90° should be avoided for the embodiments of FIGS. 5, 6 and 7.

The respective first sensing coil 19a has a first distance a from the rotation axis 18 of the rotatable element 16 and the respective second sensing coil 19b has a second distance b from the rotation axis 18 of the rotatable element 16.

Said first distance "a" and said second distance "b" are preferably identical or almost identical. Almost identical means $0.95 \leq a/b \leq 1.05$. However, it should be noted that said first distance "a" and said second distance "b" can be significantly different from each other. The ratio a/b can be in the range $0.5 \leq a/b \leq 2.0$.

LIST OF REFERENCE SIGNS 10 armature
11 fluid flow measuring device
11' fluid flow measuring device
11" fluid flow measuring device
11'" fluid flow measuring device
12 housing
13 inlet
14 outlet
15 flow channel
16 rotatable, magnetic element
17 separation plane
18 rotation axis
19 coil pair 19a sensing coil
19b sensing coil
20a ferromagnetic core
20b ferromagnetic core
21a longitudinal axis
21a''' longitudinal axis
21b longitudinal axis
21b''' longitudinal axis
22a winding axis
22a' winding axis
22a'' winding axis
22a''' winding axis
22b winding axis
22b' winding axis
22b'' winding axis
22b''' winding axis
23a recess
23b recess
24 printed circuit board
25a paddle
25a' paddle
25a''' paddle
25b paddle
25b' paddle
25b'' paddle

What is claimed is:

1. An armature, comprising:
a housing having an inlet for receiving a fluid flow, an outlet and a flow channel extending between the inlet and the outlet;
a fluid flow measuring device comprising:
   a rotatable magnetic element positioned in the flow channel and thereby within the fluid flow, wherein the rotation of the rotatable magnetic element depends on the fluid flow through the flow channel, and wherein the rotatable magnetic element has a positive pole and a negative pole and generates a magnetic field;
   at least one sensing coil pair each having a first sensing coil and a second sensing coil;
   wherein the respective sensing coils of each of the at least one sensing coil pair are arranged in such a way that the magnetic field generated by the fluid flow dependent rotation of the rotatable magnetic element has a first phase in the region of the respective first sensing coil and a second phase in the region of the respective second sensing coil, wherein said first phase and second phase differ from each other by more than 135 degrees but less than 225 degrees; and
   wherein the respective first and second sensing coils of each of the at least one sensing coil pairs are connected in series to provide a subtraction of their signals thereby reducing noise caused by a disturbing magnetic field.

2. The armature of claim 1, wherein:
the respective first sensing coil of each of the at least one sensing coil pairs is positioned around a respective first ferromagnetic core, wherein the first ferromagnetic core guides the magnetic field generated by the rotatable magnetic element to the first sensing coil;
the respective second sensing coil of each of the at least one sensing coil pairs is positioned around a respective second ferromagnetic core, wherein the second ferromagnetic core guides the magnetic field generated by the rotatable magnetic element to the second sensing coil; and
wherein the respective ferromagnetic cores are positioned within recesses of the housing outside of the flow channel and thereby outside the fluid flow.

3. The armature of claim 1, wherein the armature is one of a water treatment armature, a back flow preventer armature, a pressure regulator armature, or a control valve armature.

4. The armature of claim 1, wherein said first phase and second phase of the respective first and second coils of each of the at least one sensing coil pairs differ from each other by an angle that is within the range of 180°±5°.

5. A fluid flow measuring device, comprising:
a rotatable magnetic element positioned in a fluid flow, wherein the rotation of the rotatable magnetic element depends on the fluid flow, and wherein the rotatable magnetic element has a positive pole and a negative pole and generates a magnetic field;
at least one sensing coil pair each having a first sensing coil and a second sensing coil;
wherein the respective sensing coils of each of the at least one sensing coil pairs are arranged in such a way that the magnetic field generated by the fluid flow dependent rotation of the rotatable magnetic element has a first phase in the region of the respective first sensing coil and a second phase in the region of the respective second sensing coil, wherein said first phase and second phase differ from each other;
wherein, for each of the at least one sensing coil pairs, the first sensing coil is positioned at a first circumferential position relative to the rotatable magnetic element and the second sensing coil is positioned at a second circumferential position relative to the rotatable magnetic element, wherein an angle between the first circumferential position and the second circumferential position is in the range of 180°±5°; and
wherein for each of the at least one sensing coil pairs, the first sensing coil and the second sensing coil are connected in series to provide a subtraction of their signals thereby reducing noise caused by a disturbing magnetic field.

6. The fluid flow measuring device of claim 5, wherein:
the respective first sensing coil of each of the at least one sensing coil pairs is positioned around a respective first ferromagnetic core, wherein the first ferromagnetic core guides the magnetic field generated by the rotatable magnetic element to the respective first sensing coil; and
the respective second sensing coil of each of the at least one sensing coil pairs is positioned around a respective second ferromagnetic core, wherein the respective second ferromagnetic core guides the magnetic field generated by the rotatable magnetic element to the respective second sensing coil.

7. The fluid flow measuring device of claim 6, wherein:
the respective first sensing coil of each of the at least one sensing coil pairs is wound around the respective first ferromagnetic core, wherein a longitudinal axis of the respective first ferromagnetic core, which corresponds to a winding axis of the respective first sensing coil around the respective first ferromagnetic core, runs parallel to a rotation axis of the rotatable magnetic element; and
the respective second sensing coil of each of the at least one sensing coil pairs is wound around the respective second ferromagnetic core, wherein a longitudinal axis of the respective second ferromagnetic core, which corresponds to the winding axis of the respective second sensing coil around the respective second ferromagnetic core, runs parallel to the rotation axis of the rotatable magnetic element and parallel to the longitudinal axis of the respective first ferromagnetic core.

8. The fluid flow measuring device of one of claim 6, wherein:
a longitudinal axis of the first ferromagnetic core is spaced a first distance (a) from a rotation axis of the rotatable magnetic element; and
a longitudinal axis of the second ferromagnetic core is spaced a second distance (b) from the rotation axis of the rotatable magnetic element.

9. The fluid flow measuring device of claim 8, wherein said first distance (a) and said second distance (b) have a ratio a/b that is in the range of $0.95 \leq a/b \leq 1.05$.

10. The fluid flow measuring device of claim 5, wherein:
the respective first sensing coil of each of the at least one sensing coil pairs is an air coil, wherein a winding axis of the respective first sensing coil runs perpendicular to a rotation axis of the rotatable magnetic element; and
the respective second sensing coil of each of the at least one sensing coil pairs is an air coil, wherein a winding axis of the respective second sensing coil runs perpendicular to the rotation axis of the rotatable magnetic element.

11. The fluid flow measuring device of one of claim 10, wherein:
the respective first sensing coil is spaced a first distance (a) from the rotation axis of the rotatable magnetic element; and
the respective second sensing coil is spaced a second distance (b) from the rotation axis of the rotatable magnetic element.

12. The fluid flow measuring device of claim 11, wherein the first distance (a) and the second distance (b) have a ratio a/b that is in the range of $0.95 \leq a/b \leq 1.05$.

13. The fluid flow measuring device of claim 5, wherein:
the respective first sensing coil of each of the at least one sensing coil pairs is wound around a respective first ferromagnetic core, wherein the respective first ferromagnetic core guides the magnetic field generated by the rotatable magnetic element to the respective first sensing coil, and wherein a longitudinal axis of the respective first ferromagnetic core runs perpendicular to a rotation axis of the rotatable magnetic element; and
the respective second sensing coil of each of the at least one sensing coil pairs is wound around a respective second ferromagnetic core, wherein the respective second ferromagnetic core guides the magnetic field generated by the rotatable magnetic element to the respective second sensing coil, and wherein a longitudinal axis of the respective second ferromagnetic core runs perpendicular to the rotation axis of the rotatable magnetic element and parallel to the longitudinal axis of the respective first ferromagnetic core.

14. The armature of claim 5, wherein the rotatable magnetic element comprises a plurality of positive and negative pole pairs.

15. The armature of claim 14, wherein the rotatable magnetic element comprises a paddle wheel with a plurality of paddle wheel pairs, wherein each paddle wheel pair forms one of the plurality of positive and negative pole pairs.

16. A fluid flow measuring device, comprising:
a rotatable magnetic element positioned in a fluid channel and thus in a fluid flow, wherein the rotation of the rotatable magnetic element depends on the fluid flow, and wherein the rotatable magnetic element has a positive pole and a negative pole and generates a magnetic field;
at least one sensing coil pair each having a first sensing coil and a second sensing coil;
wherein the respective sensing coils of each of the at least one sensing coil pair are arranged in such a way that the magnetic field generated by the fluid flow dependent rotation of the rotatable magnetic element has a first phase in the region of the respective first sensing coil and a second phase in the region of the respective second sensing coil, wherein said first phase and second phase differ from each other;
the respective first sensing coil of each of the at least one sensing coil pairs is positioned around a respective first ferromagnetic core that is positioned at a first circumferential position relative to the rotatable magnetic element, wherein the first ferromagnetic core guides the magnetic field generated by the rotatable magnetic element to the first sensing coil;
the respective second sensing coil of each of the at least one sensing coil pair is positioned around a respective second ferromagnetic core that is positioned at a second circumferential position relative to the rotatable magnetic element, wherein the second ferromagnetic core guides the magnetic field generated by the rotatable magnetic element to the second sensing coil;
wherein an angle between the corresponding first circumferential position and the corresponding second circumferential position is 180°±5° and wherein the respective first sensing coil and the respective second sensing coil are connected in series to provide a subtraction of their signals thereby reducing noise caused by a common mode magnetic field; and
wherein the respective ferromagnetic cores are positioned within corresponding recesses in the housing outside of the flow channel and thereby outside the fluid flow.

* * * * *